United States Patent [19]
Anderson

[11] Patent Number: 5,973,734
[45] Date of Patent: Oct. 26, 1999

[54] METHOD AND APPARATUS FOR CORRECTING ASPECT RATIO IN A CAMERA GRAPHICAL USER INTERFACE

[75] Inventor: Eric C. Anderson, San Jose, Calif.

[73] Assignee: FlashPoint Technology, Inc., San Jose, Calif.

[21] Appl. No.: 08/891,424

[22] Filed: Jul. 9, 1997

[51] Int. Cl.⁶ .................................................. H04N 5/225
[52] U.S. Cl. ............................................ 348/239; 348/222
[58] Field of Search ..................................... 348/207, 222, 348/239, 333, 334, 96, 97, 98, 445, 556; 396/311, 373, 374; 358/513, 527, 909.1, 487; 345/132, 138, 133; 382/232, 233; H04N 5/225

[56] References Cited

U.S. PATENT DOCUMENTS 5,448,372  9/1995  Axman et al. ............................ 348/96
5,619,738  4/1997  Petruchlk et al. ...................... 396/311

*Primary Examiner*—Tuan V. Ho
*Attorney, Agent, or Firm*—Sawyer & Associates

[57] ABSTRACT

A method and system for correcting the aspect ratio of an image captured by a digital camera is disclosed. In one aspect, the method and system include determining if the image requires cropping, decompressing the image, and cropping the image if the image required cropping. The image is then provided to a display. In another aspect, the method and system include cropping an image to a predetermined shape and providing the data to a display buffer.

10 Claims, 13 Drawing Sheets

METHOD AND APPARATUS FOR CORRECTING ASPECT RATIO IN A CAMERA GRAPHICAL USER INTERFACE

FIELD OF THE INVENTION

The present invention relates generally to digital cameras, and more particularly to a method and apparatus for providing correction of the aspect ratio of images captured by digital cameras.

BACKGROUND OF THE INVENTION

Conventional digital cameras capture an image using a charge-coupled device (CCD) array. Such cameras also typically use a liquid-crystal display (LCD) screen to provide information to the user, to act as a viewfinder, and to display the captured images. LCD screens typically have an aspect ratio of 4:3, as do most video components. Although many CCD arrays also have a 4:3 aspect ratio, CCD arrays that are compatible with photographic standards have a 3:2 aspect ratio. Currently, conventional digital cameras utilize CCD arrays having a 4:3 aspect ratio.

Conventional digital cameras are also capable of taking images that could be considered either portrait or landscape images. Portrait images are those images having a height greater than the width. Landscape images typically have a width greater than length. A user typically captures a landscape image by keeping the digital camera in a standard upright orientation. A portrait image is captured by rotating the camera either right or left prior to capturing the image.

Although conventional digital cameras are capable of capturing both landscape and portrait images, when the image is displayed on the LCD screen the orientation of the image is unchanged. Consequently, in order to view a portrait image in the proper orientation, a user must rotate the digital camera to the right or the left. If the digital camera rotates the image automatically, the aspect ratio of a rotated portrait image does not match the aspect ratio of the landscape oriented LCD screen. In addition, a manufacturer of a digital camera may not use a CCD array having a 3:2 aspect ratio and produce an image having an aspect ratio that is the same as the aspect ratio of the LCD screen. An image produced by such a CCD array would either be too wide for the LCD screen, assuming the image from the CCD array is scaled up so that the height of the image equals that of the LCD screen, or not tall enough to fill the LCD screen, assuming the image from the CCD array is scaled up so that the width of the image equals that of the LCD screen.

Accordingly, what is needed is a method and system for correcting the aspect ratio of an image for display, for example on an LCD screen. The present invention addresses such a need.

SUMMARY OF THE INVENTION

The present invention provides a method and system for correcting the aspect ratio of an image captured by an image capture device. In one aspect, the method and system comprise determining if the image requires cropping, decompressing the image if required, cropping the image if the image requires cropping, and providing the image to a display. In another aspect, the method and system comprise cropping an image to a predetermined shape and providing the cropped image to a display buffer.

According to the system and method disclosed herein, the present invention corrects the aspect ratio of an image regardless of whether the image is a portrait or a landscape image, or whether the aspect ratio of an image sensor matches that of a display. Overall system performance is thereby increased.

DETAILED DESCRIPTION OF THE INVENTION

The present invention relates to an improvement in digital cameras. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Conventional digital cameras capture an image using an image sensor, typically charge-coupled device (CCD) array. The user interface for such a camera typically includes a liquid-crystal display (LCD) screen. The functions of the LCD screen include acting as a viewfinder and displaying captured images. Typically, the LCD screen is relatively small, measuring only a couple of inches across. LCD screens typically have an aspect ratio of 4:3. Although many CCD arrays also have an aspect ratio of 4:3, CCD arrays that are compatible with photographic standards have an aspect ratio of 3:2.

Figure 1A:
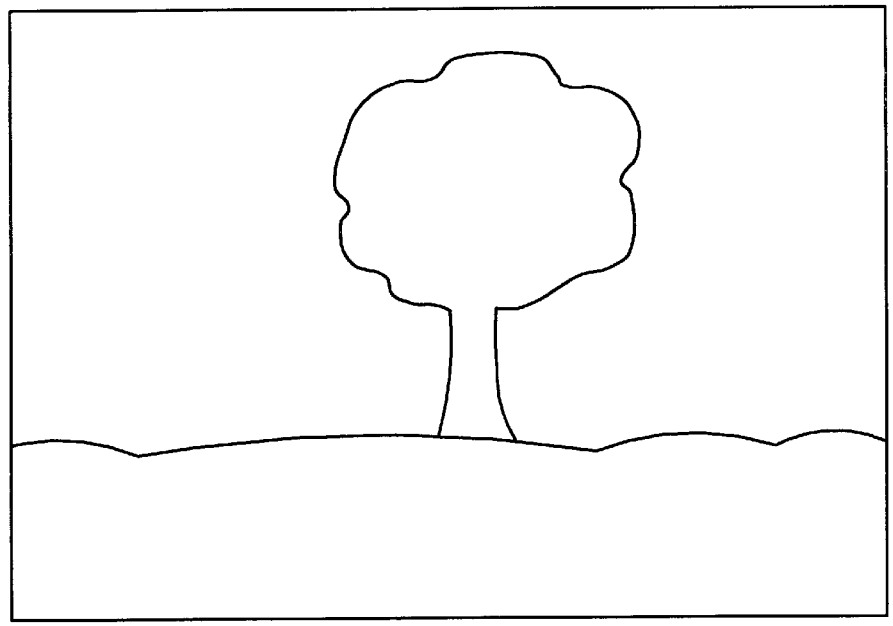
FIG. 1A is a diagram of a landscape image.
Figure 1B:
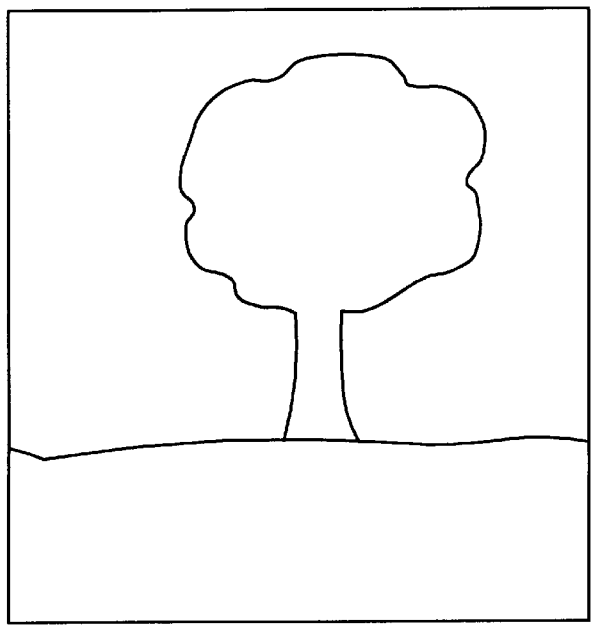
FIG. 1B is a diagram of a portrait image.

Conventional digital cameras are also capable of taking images that could be considered either portrait or landscape images. FIG. 1A depicts a landscape image. FIG. 1B depicts a portrait image. Typically, a user captures a landscape image by keeping the digital camera in a standard upright orientation. In contrast, a portrait image is captured by rotating the camera either right or left by approximately ninety degrees prior to capturing the image. For example, a right rotation portrait image is captured by rotating the camera approximately ninety degrees right before capturing an image. A left rotation portrait image is captured by rotating the camera approximately ninety degrees left before capturing an image.

Although conventional digital cameras use CCD arrays having an aspect ratio of 4:3, one of ordinary skill in the art will readily recognize that a manufacturer of a digital camera may wish to use a CCD that is consistent with photographic standards. Such a CCD array has an aspect ratio of 3:2. In such a case, the image produced by the CCD array will have an aspect ratio that does not match the aspect ratio of the LCD screen. Therefore, the image must be processed for display on the LCD screen. If the image from the CCD array is simply scaled up so that the height of the image equals that of the LCD screen, the image produced by such a CCD array would be too wide for the LCD screen. If the image from the CCD array is scaled up so that the width of the image equals that of the LCD screen, the image will not be tall enough to fill the LCD screen. Such a small image may be more difficult for the user to see because of the empty space above and below the image and the small size of the LCD screen.

One of ordinary skill in the art will also recognize that the ability of conventional digital cameras to capture both landscape and portraits restricts the ability of the user to easily view images. When the image is displayed on the LCD screen the orientation of the image is unchanged. Consequently, in order to view a portrait image in the proper orientation, a user must rotate the digital camera to the right or the left. Even if the digital camera was capable of changing the orientation of the image to match the orientation of the digital camera, a portrait image has an aspect ratio of 3:4 or 2:3, depending on the CCD array used, while the LCD screen has an aspect ratio of 4:3. In either case, the aspect ratio of the rotated portrait image will not match the aspect ratio of either the LCD screen or landscape images. If a portrait image is scaled down so that the height of a portrait image matches the height of a landscape image, one of ordinary skill in the art will realize that there will be empty space to the right and left of the portrait image. If the height of the portrait image is too small a fraction of the LCD screen's height, the image will be difficult for the user to see because of the empty space and the small size of the LCD screen.

The present invention provides a method and system for correcting the aspect ratio of an image taken by a digital camera. Although the method and system will be described in terms of an image displayed on the digital camera, one of ordinary skill in the art will recognize that the method and system are not limited to display on a digital camera and are applicable to other systems displaying the image, such as a host system. In addition, although the method and system are described in terms of displaying the image in two modes of the digital camera, the method and system are fully applicable to any mode in which the image is displayed.

Figure 2:
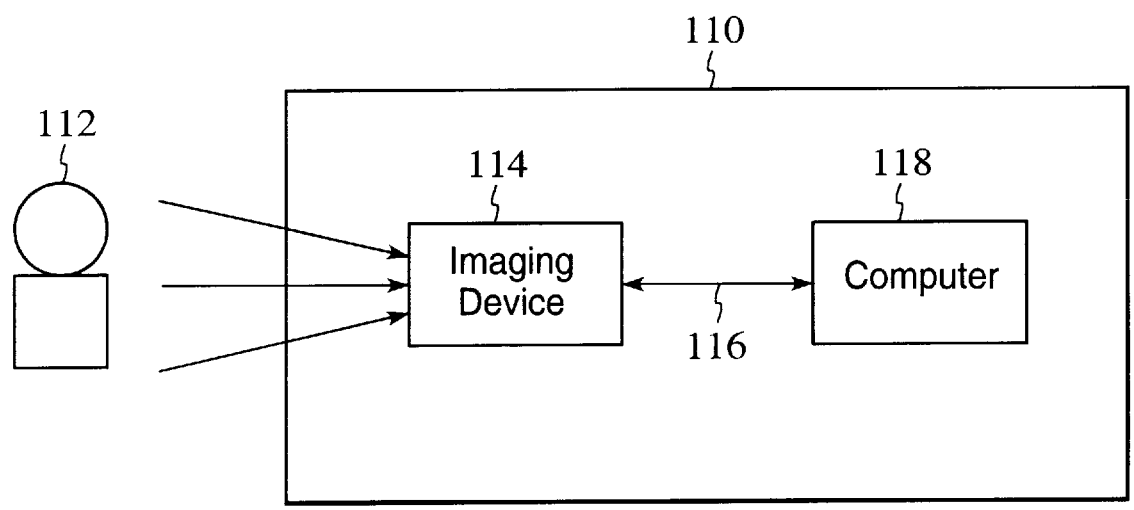
FIG. 2 is a block diagram of a digital camera that operates in accordance with the present invention.

Referring now to FIG. 2, a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118. Finally, although the present invention is described in terms of a digital camera, one of ordinary skill in the art will readily realize that the method and system are fully applicable to any image capture device.

Figure 3:
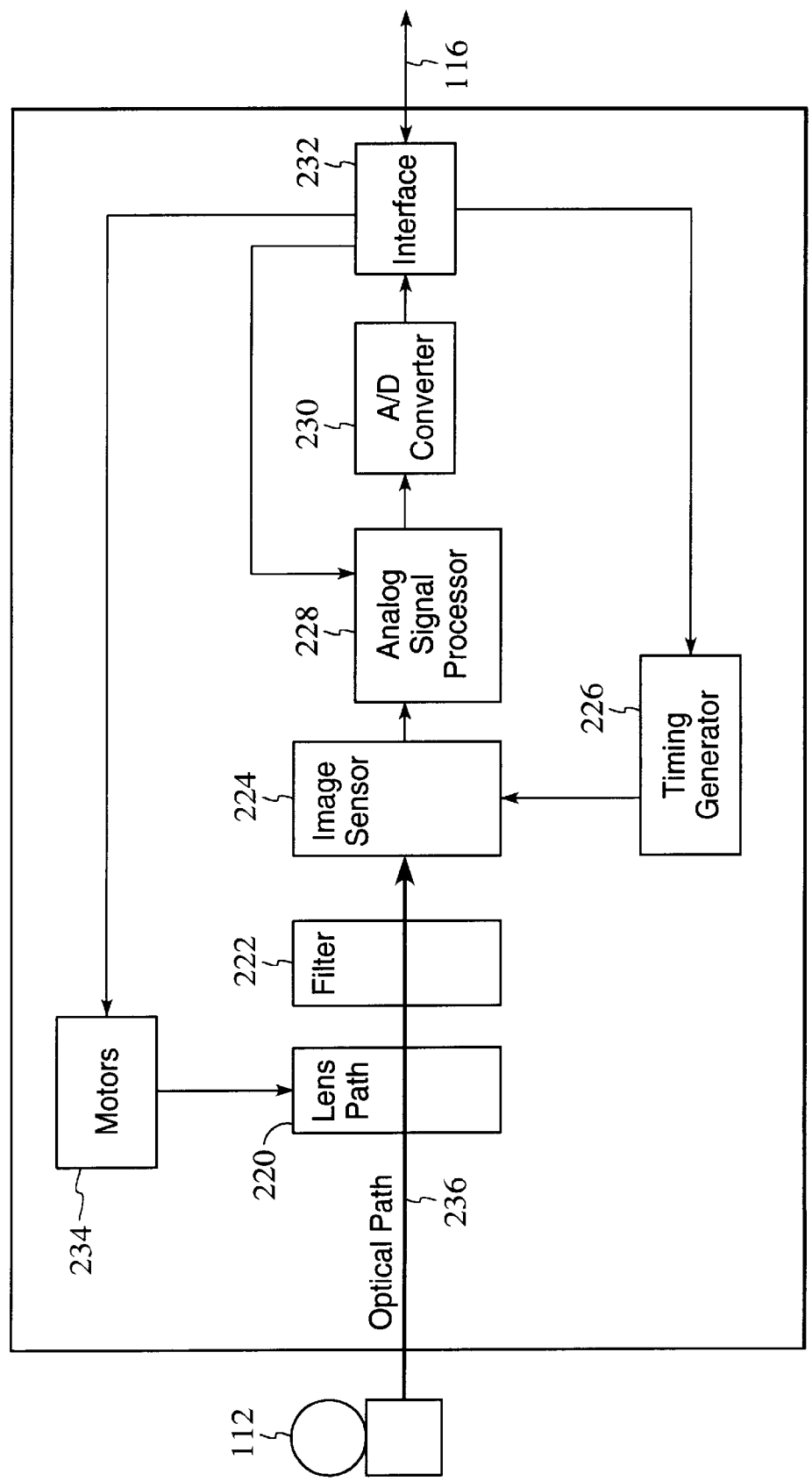
FIG. 3 is a block diagram of one embodiment for the imaging device of FIG. 1.

Referring now to FIG. 3, a block diagram of one preferred embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 4:
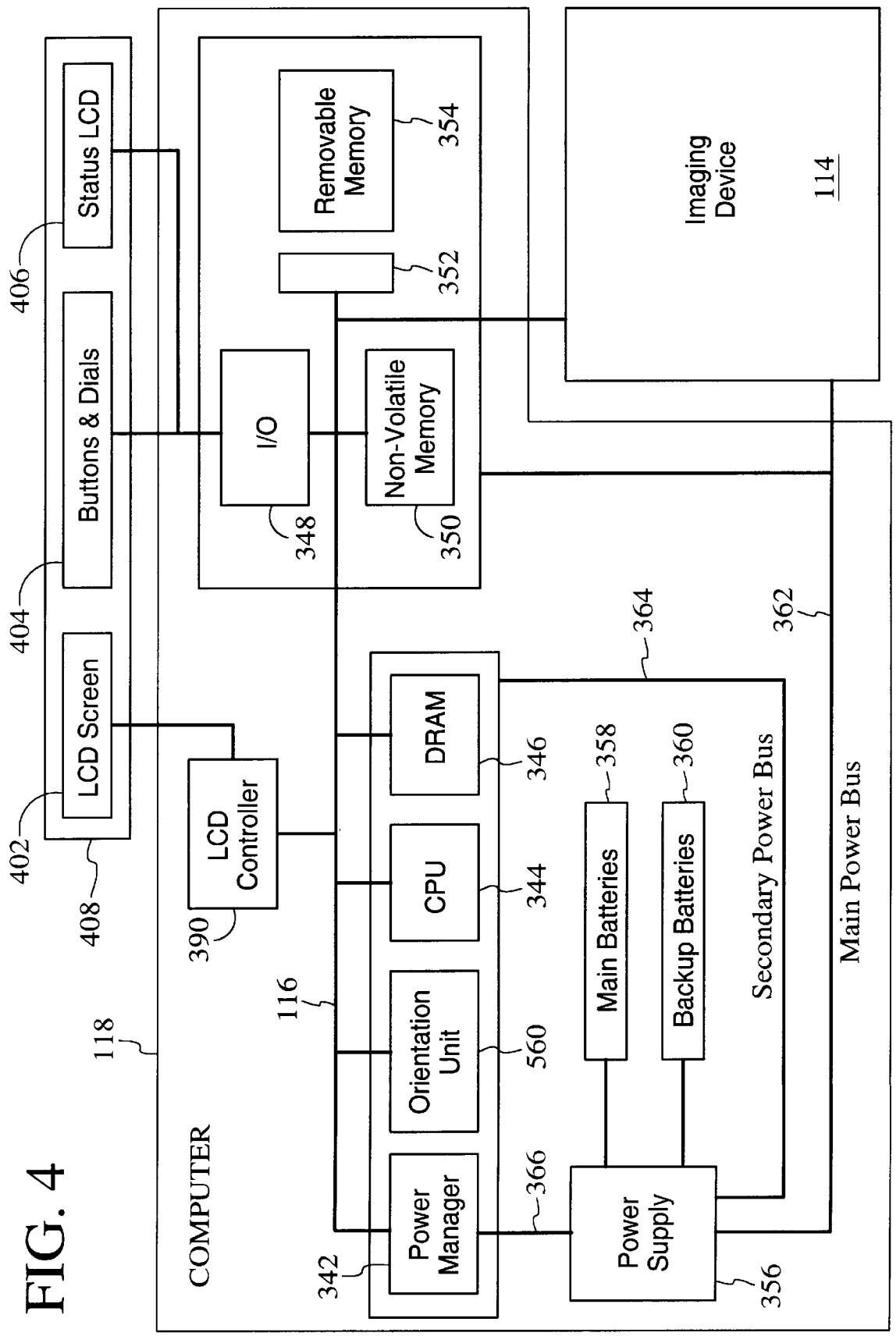
FIG. 4 is a block diagram of one embodiment for the computer of FIG. 1.

Referring now to FIG. 4, a block diagram of one preferred embodiment for computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352. The orientation unit 560, discussed more fully below, can sense which position the digital camera 110 is currently in. The orientation unit 560 sends signals to the CPU 344 indicating the current orientation of the digital camera 110.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera=s user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk. Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 5A:
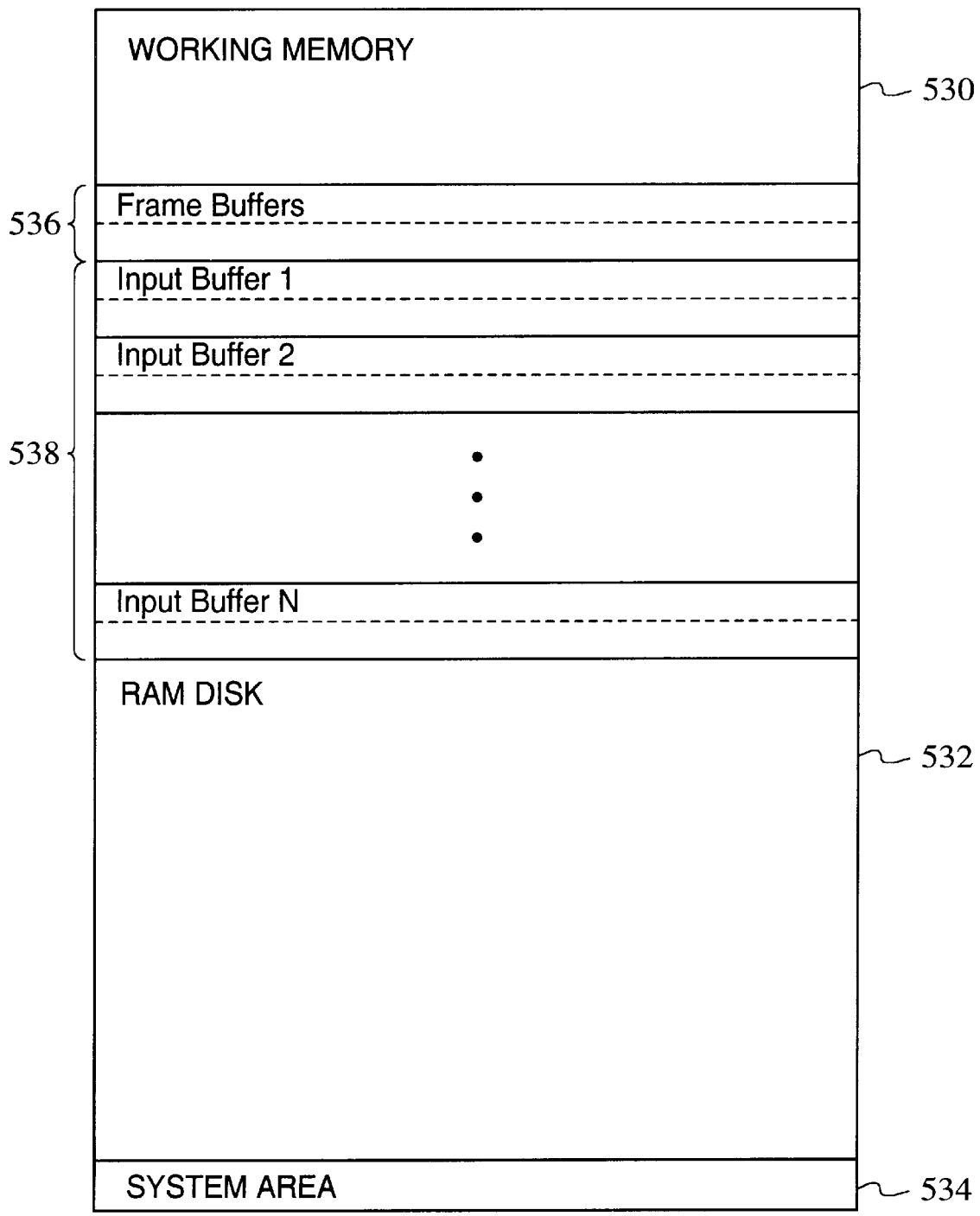
FIG. 5A is a memory map showing the embodiment of the Dynamic Random-Access-Memory (DRAM).

Referring now to FIG. 5A, a memory map showing one embodiment of dynamic random-access-memory (DRAM) 346 is shown. In the preferred embodiment, DRAM 346 includes RAM disk 532, a system area 534, and working memory 530.

RAM disk 532 is a memory area used for storing raw and compressed image data and typically is organized in a Asectored@ format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Figure 5B:
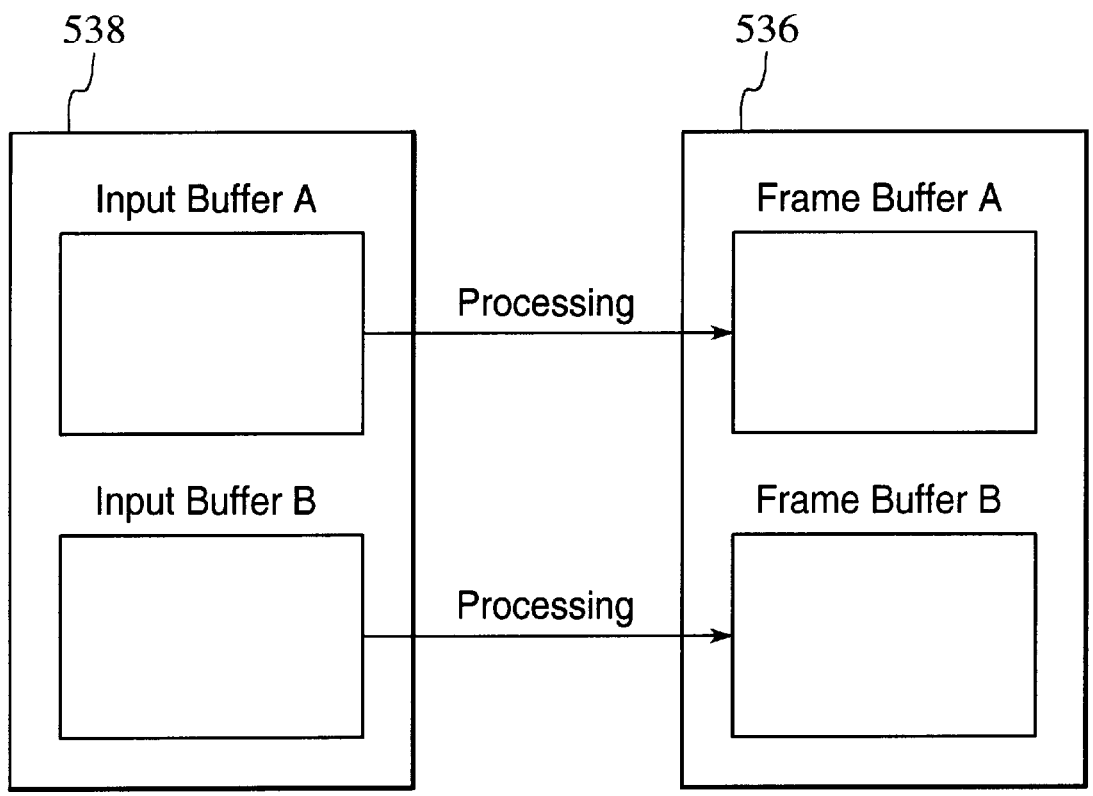
FIG. 5B is a block diagram illustrating the contents of one of the input buffers and the contents of the frame buffer.

Working memory 530 includes various stacks, data structures and variables used by CPU 344 while executing the software routines used within computer 118. Working memory 530 also includes several input buffers 538 for temporarily storing sets of raw image data received from imaging device 114, and a frame buffer 536 for storing data for display on the LCD screen 402. In a preferred embodiment, each input buffer 538 and the frame buffer 536 are split into two separate buffers, called ping-pong buffers (shown by the dashed lines), to improve the display speed of the digital camera and to prevent the tearing of the image in the display 402. Referring now to FIG. 5B, the contents of one of the input buffers 538 and the contents of the frame buffer 536 are illustrated. As shown, each input buffer 538 includes an input buffer A and an input buffer B, and the frame buffer 536 includes a frame buffer A and a frame buffer B. The input buffers A and B alternate between an input cycle and a processing cycle. During the input cycle, the input buffers 538 are filled with raw image data from the image device 114, and during the processing cycle, CPU 344 processes the raw data and transmits the processed data to the frame buffers 536.

Figure 6:
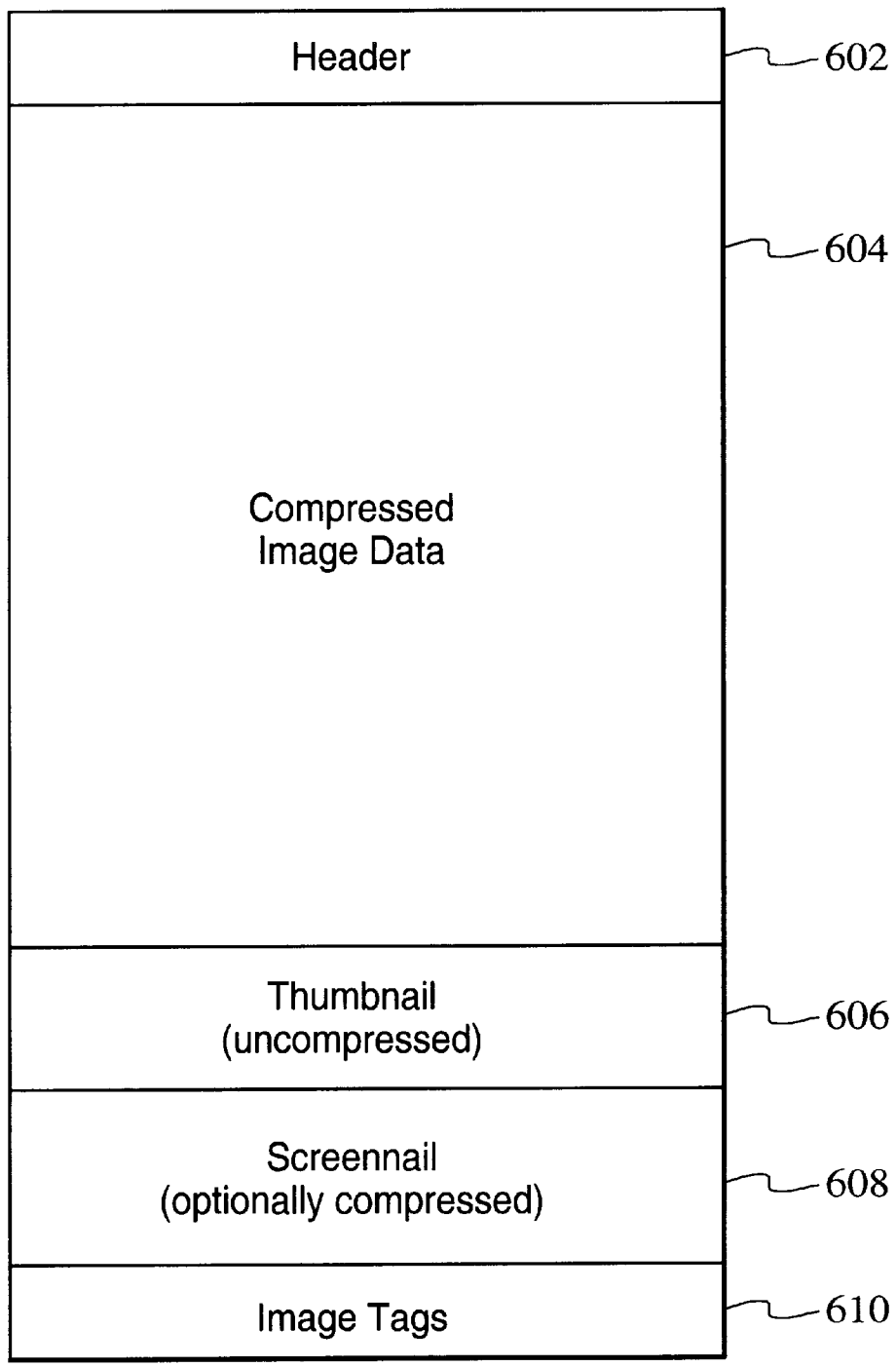
FIG. 6 is a block diagram illustrating an enhanced format of still image file in accordance with the present invention.

Referring now to FIG. 6, a block diagram of an enhanced format of still image file in accordance with the present invention is shown. The image file 600 includes a header 602, compressed image data 604, a thumbnail image 606, a screennail 608, and an image tag field 610. The image file 600 may also include a sound file (not shown) if a sound clip has been attached to the particular image.

The header 602 includes information identifying the particular image file and the image represented by the image data 604. The image data 604 is the actual data comprising the full-sized captured image in compressed form, preferably in JPEG format. Although the user can typically choose the resolution mode in which images are captured, once an image is processed and compressed, the compressed image data 604 is the high-resolution representation of the image compared to the thumbnail 606 and screennail 608. If the image is captured at a resolution of 640×480 pixels, for example, then the compressed image data 604 is typically fifty-to-sixty kilobytes in size.

The thumbnail image 606 is a small, uncompressed low-resolution version of the image. In a preferred embodiment, the pixel size of thumbnail image 606 is less than the display size of the LCD screen 402 (e.g., 80×60 pixels), and has a storage size of approximately ten kilobytes.

The screennail image 608 is a medium-resolution version of the image and in a preferred embodiment is also compressed, although compressing the screennail 608 is optional. Unlike the thumbnail image 606, the screennail image 608 is display-sized and fills the visible area of the LCD screen 402 when displayed. In one embodiment, the screennail image 608 is optional. The screennail image 608 may be optional because the image sensor 224 is small enough, for example 640×480 pixels in size, that the image data 602 can be very rapidly provided to the LCD screen 402. Similarly, the screennail image 608 may be optional where the hardware for the camera 110 is capable of providing the image data 604 rapidly enough. In a preferred embodiment, the pixel size of a compressed screennail image 608 is preferably 288×216 and requires approximately fifteen kilobytes to store.

The image tag field 610 includes information, preferably in the form of tags, regarding the image represented by the image data 604. Media type tags, for instance, indicate all the media types associated with the image, such as whether the image is a single image or a panorama image, for example. In certain operating modes, the media type tags are used to select the type of icon that is displayed in the LCD 402 along side the thumbnail image 606. Besides media tags, the image tag field 610 may also include other types of tags for storing additional information regarding the image and/or the camera 110 itself. For example, a tag could be used to indicate the settings of the camera 110 at the time the image was captured, or indicate the identity of the camera manufacturer, for instance. The information in these tags may be accessed through the buttons on the camera interface 400. The additional information may then be displayed either as text in the LCD 402.

The enhanced image file 600 of the present invention is created for each image as the user takes pictures while the camera is in capture mode. The enhanced image file 600 is then used to accelerate the user interface of the digital camera in the review and play mode as follows. When the camera is placed into review mode, the thumbnail images 606 contained in the image files 600 are directly displayed on the LCD 402 as representations of captured images, which eliminates the need to process and decompress the compressed image data 604. And when the camera is placed into play mode, the screennail image 608 contained in the image file 600 is first decompressed and displayed on the LCD 402 and then optionally updated with the higher-resolution compressed image data 604 as the image data 604 is being decompressed. This feature enables the digital camera to quickly display a full-sized version of the captured image in the LCD 402 without the delay incurred by first decompressing the higher-resolution JPEG image and resizing it to fit on the LCD 402. Whether or not to decompress and display the compressed image data 604 depends on the resolution of the display and the resolution of the screennail images 608.

Figure 7:
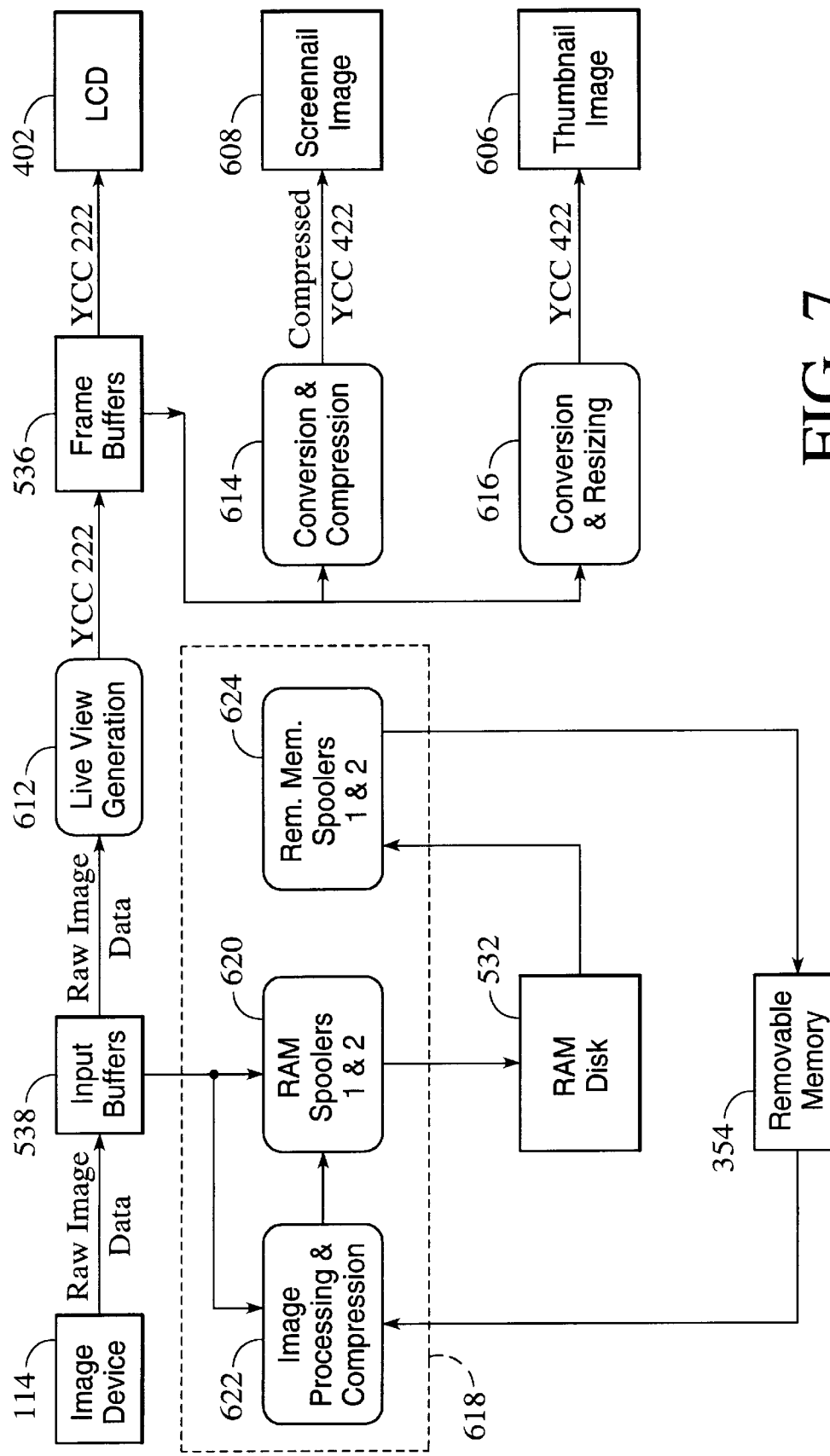
FIG. 7 is a block diagram illustrating the image file generation process, which begins when the camera is in capture mode and the user presses a shutter button to capture an image.

Referring now to FIG. 7, a block diagram is shown of the image file generation process, which begins when the camera is in capture mode and the user presses a shutter button (not shown) to capture an image. As described above, before the user captures an image in capture mode, frames of raw image data are sequentially captured by the imaging device 114 at a reduced resolution suitable for LCD screen 402, and each of the frame of the raw image data are stored in the ping-pong buffers (FIG. 5B) of an input buffer 538. The live view generation process 612 performs gamma correction and color conversion on the raw image data to convert the data into the YCC format of the LCD screen 402, typically YCC 222 format, and then transfers the YCC 222 data for each frame to the frame buffers 536 for display. The raw image data placed into the input buffers 538 is also processed for extracting exposure, focus, and white balance settings.

Once the user presses the shutter button to capture an image, the raw image data is captured by the image device 114 at a resolution set by the user and the raw image data is stored into an appropriate number of input buffers 538.

The raw image data is then used to generate an enhanced image file 600 for the captured image including the compressed image data 604, the thumbnail 606, and the screennail 608, as shown in FIG. 6.

When generating the thumbnail and screennail images 606 and 608, the present invention takes advantage of the fact that the YCC data in the frame buffers 536 has already been processed by the live view generation process 612 and stored at the reduced resolution of the LCD screen 402. Since the thumbnail and screennail images 606 and 608 are also intended to be lower-resolution representations of the captured image, the previously processed YCC data in the frame buffers 536 is used to generate the thumbnail 606 and screennail 608 directly, rather than using the raw image data stored in the input buffers 538.

To generate the screennail image 608, the YCC data in the frame buffers 536 is converted from YCC 222 format into YCC 422 format and compressed by a conversion and compression process 614. To generate the thumbnail image 606, the YCC data in the frame buffers 536 is converted from the YCC 222 format into YCC 422 format and then resized by a conversion and resizing process 616. During the conversion and resizing process 616, the thumbnail image 606 may be resized by averaging in which a block of pixel values from the YCC 422 data are averaged to represent one pixel value of the thumbnail image 606, and/or by sub-sampling the YCC 422 data in which only a certain number pixels in a block are used to represent one pixel in the thumbnail image 606.

Referring now to FIGS. 5A, 6 and 7, after the thumbnail image 606 and the screennail 608 are generated, they are stored in working memory 530 until the compressed image data 604 is generated. The compressed image data 604 may be generated either before or after the thumbnail and screennail images 606 and 608. However, in a preferred embodiment, the compressed image data 604 is generated after the thumbnail and screennail images 606 and 608 are generated using a background spooling process 618. In an alternative embodiment, the thumbnail image 606 and the screennail 608 may be generated by the background spooling process 618 along with the compressed image data 604.

In another preferred embodiment, the thumbnail image 606 and the screennail 608 may be generated using a two-stage live view generator 612. In the first stage, the live view generator 612 provides images to the frame buffer 536 for display as described above. When the user captures an image, the raw image data from the imaging device is compressed due to higher quality before being stored in the input buffers 538, and the live view generator 612 switches to the second stage. In this stage, the live view generator 612 decompresses the compressed raw image data and processes the data into both YCC 222 data and YCC 422 data. The live view generator 612 may then transfer the YCC 422 data to the frame buffer 536 for display, and generate the thumbnail image 606 and the screennail 608 from the YCC 422 data.

The background spooling process 618 preferably includes RAM spoolers 1 and 2 (620), removable memory spoolers 1 and 2 (624), and an image processing and compression process (IPC) 622. Processes 620, 622 and 624 are preferably implemented as background processes on CPU 344 and may therefore run in parallel with other processes. As used herein, a spooler is a process that transfers data from one process or device to a second process or device. The primary purpose of the background spooling process 618 is to move data out of the input buffers 538 as fast as possible in order to free the input buffers 538 to capture another image. After the data is moved, the data is processed in the background. This allows the next image to be captured before the previous image is processed and compressed, which increases the capture rate of the digital camera.

In operation, after the user has captured an image, control of the raw image data in the input buffers 538 is transferred to RAM spooler 1 (620) if the RAM disk 532 is not full. If the RAM spooler 1 (620) obtains control of the raw image data, then the RAM spooler 1 (620) transfers the raw image data to the RAM disk 532. Alternatively, if the RAM disk 532 is full, then control of the raw image data is transferred to the IPC 622 where the data is processed and compressed to generate the compressed image data 604 (FIG. 6).

In the case where the raw image data has been transferred to the RAM disk 532, the removable memory spooler 1 (624) may then access the raw image data from the RAM disk 532 and transfer it to the removable memory 354. Once the raw image data is transferred to the removable memory 354, the IPC 622 accesses the raw image data and processes the raw image data to generate the compressed image data 604. Alternatively, if the removable memory 354 is full or is not present, then the removable memory spooler 1 (624) may provide the raw image data directly to the IPC 622 for generation of the compressed image data 604.

After the compressed image data 604 is generated, the IPC 622 may provide the compressed image data 604 to the RAM spooler 2 (620). The compressed image data 604 is then combined with the thumbnail 606 and the screennail 608 to generate the enhanced image data file (FIG. 6), and the RAM spooler 2 (620) transfers the compressed image data file 600 to the RAM disk 532. Once the image data file 600 is written to RAM disk 532, the removable memory spooler 2 (624) may then access the image data file 600 and write the image data file 600 onto the removable memory 354. If the removable memory 354 is not inserted, the image data file 600 remains on the RAM disk 532. It should be noted that in an alternative embodiment, the digital camera may be implemented without a RAM disk 532, in which case the image data would be spooled to and from the removable memory 354.

In addition, a method and system for determining the orientation of a digital camera has been disclosed in co-pending U.S. patent application Ser. No. 08/795,587 entitled "Apparatus and Method for Camera Image and Orientation Capture" filed on Feb. 6, 1997 and assigned to the assignee of the present application. Rotation of captured images has been disclosed in U.S. patent application Ser. No. 08/903,890 entitled "Auto-Rotating GUI For Managing Portrait and Landscape Capture in Review Mode" filed on Jul. 31, 1997, and assigned to the assignee of the present application. Applicant hereby incorporates by reference the above-mentioned co-pending applications.

Figure 8:
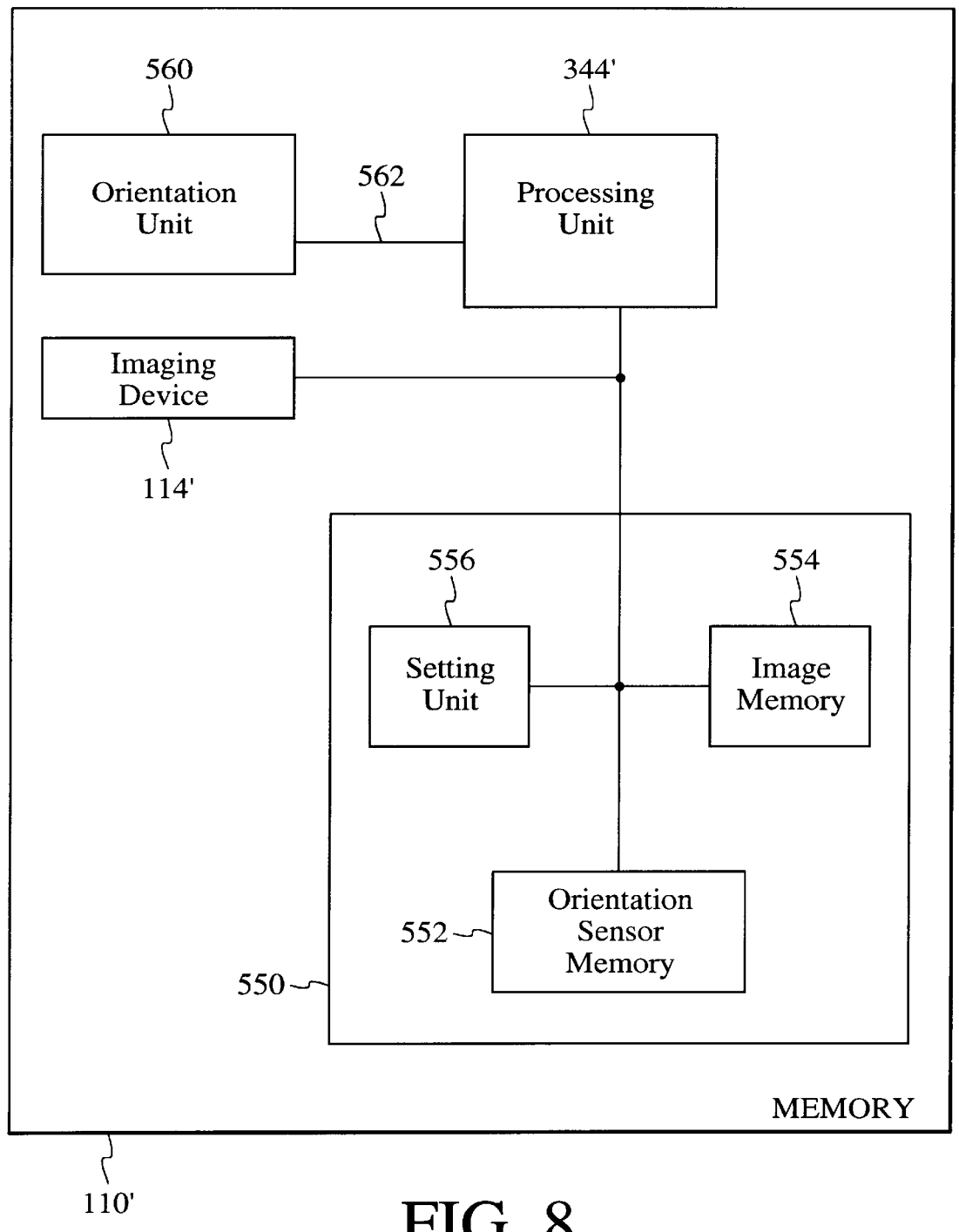
FIG. 8 is a block diagram depicting a portion of one embodiment of a digital camera including an orientation unit.

FIG. 8 depicts a portion of one embodiment of the camera 110' including an orientation unit 560. Components similar to those discussed with respect to FIGS. 2 through 4 are labeled similarly. The digital camera 110' includes a processing unit 344' having at least one orientation input, at least one setting input and a bidirectional communications port. The digital camera 110' also includes a memory 550 and an imaging device 114'. The orientation unit 560 has at least one orientation output. The memory 550 includes an image memory 554, a setting unit 556, and an orientation memory 552. The memory 550 can be included in one or more of the components of the camera 110, including the DRAM 346 or the non-volatile memory 350. In a preferred embodiment, the orientation unit 560 is implemented in the digital camera 110 as shown in FIG. 4.

Each orientation output of the orientation unit 560 is coupled to a corresponding orientation input of the processing unit 344' via an orientation signal line 562. The bidirectional communication port of the processing unit 344', the memory 550, and the output of the imaging device 114' are coupled via common bus 116'. In an alternative embodiment, the orientation unit 560 may also be coupled to the processing unit 344' through the common bus 116'. The processing unit 344', the imaging device 114', the orientation unit 560, and the memory 550 are also coupled to a power source, not shown.

In one embodiment, the orientation unit 560 includes first and second orientation sensors (not shown). In this embodiment, the first orientation sensor determines whether the camera 110' is rotated to the left or right. Thus, the first orientation sensor determines whether the camera has been rotated to a left rotation portrait, a right rotation portrait, an upright or an inverted position. In this embodiment, the first orientation sensor outputs a left orientation signal for left rotation portraits and a right orientation signal for right rotation portraits. The second orientation sensor determines whether the camera 110' is tilted forward or backward. In such an embodiment, the second orientation sensor outputs a forward and a backward orientation signal.

Figure 9:
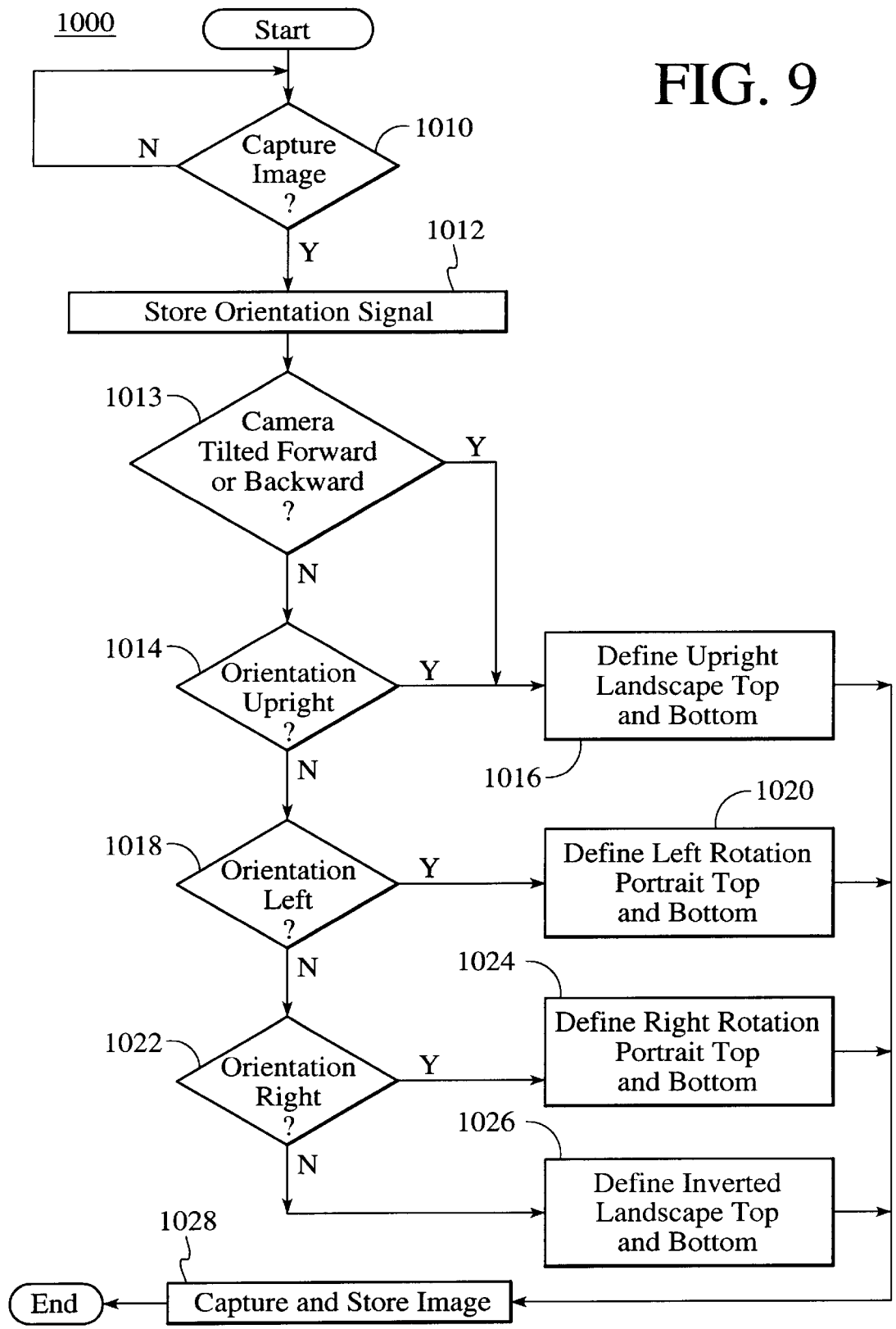
FIG. 9 is a flow chart of one embodiment of a method for camera image and orientation capture.

Referring now to FIG. 9, a flow chart of one method 1000 for camera image and orientation capture is shown. The method 1000 is used for capture of four orientations: upright, inverted, left orientation (for a left rotation portrait image), and right orientation (for a right rotation portrait image). First, the processing unit 344' determines whether the image is to be captured via step 1010. In one embodiment, this determination is made based on ascertaining whether an image capture or shutter button, not shown, has been depressed. The processing unit 344' may determine whether the image capture button has been depressed by monitoring the value of a shutter activation signal, not shown. If an image is not to be captured, then subsequent steps are not executed. If an image is to be captured, the processing unit 344' stores the right and left orientation signals in the orientation signal memory 552 via step 1012. In one embodiment, the stored orientation signals include the left and right orientation signals as well as the forward and backward orientation signals.

The setting unit 556 then determines if the camera 110' is in a forward or backward orientation via step 1013. If the camera 100' is in a forward or backward orientation, the image is defined to be an upright landscape via step 1016. The image is so defined because where the camera is tilted forward or backward, whether the image is a conventional portrait image or a landscape image may be difficult to determine. In addition, in one embodiment, the sensor for determining left and right orientation, not shown, may not operate properly when the camera 110' is tilted forward or backward. Next, the setting unit 556 receives the orientation signals and determines whether the camera 110' is in an upright orientation in step 1014. If the camera 110' is in an upright orientation, the setting unit 556 defines the top portion and the bottom of the image as the top and bottom, respectively, of an upright landscape image via step 1016.

If the setting unit 556 determines in step 1014 that the camera 110' is not in an upright orientation, then the setting unit 556 determines whether the camera 110' is in a left orientation in step 1018. If the camera 110' is in a left orientation, the setting unit 556 defines the top and bottom of the image as the top and bottom, respectively, of a left rotation portrait image via step 1020.

If the setting unit 556 determines in step 1018 that the camera 110' is not in a left orientation, then the setting unit 556 determines whether the camera 110' is in a right orientation in step 1022. If the camera 110' is in a right orientation, the setting unit 556 defines the top and bottom of the image as the top and bottom, respectively, of a right rotation portrait image via step 1024.

If the setting unit 556 determines in step 1022 that the camera 110' is not in a right orientation, the setting unit 556 defines the top and bottom of the image as the top and bottom, respectively, of an inverted landscape image. After each of the steps 1016, 1020, 1024, or 1026, the processing unit 344' issues an image capture command via step 1028, transferring the pixel signals output by the imaging device 114' to the image memory 554'.

In a preferred embodiment, the orientation unit 560 and its functions are implemented in the camera 110 as shown in FIG. 4. Portions of the memory 550, such as image memory 554, may be included in the DRAM 346. In addition, the functions of the setting unit 556, such as determining the orientation of the camera and setting the top and bottom of the image, may be performed by another component, such as the CPU 344. Certain functions and components of the camera 110, such as the input buffer 538, frame buffers 536, or image processing and compression, are not discussed with respect to the method 1000. However, in a preferred embodiment, these functions are performed in conjunction with the method 1000. Consequently, the method 1000 is independent of the hardware used. Finally, the method 1000 may be used to define, for example, only the top or the bottom of a particular image rather than both the top and the bottom of the image. By using the orientation unit 560, the digital camera 110 is capable not only of capturing the orientation of an image but also rotating the image, for example to be in an upright orientation regardless of the orientation of the camera 110 during image capture.

Figure 10:
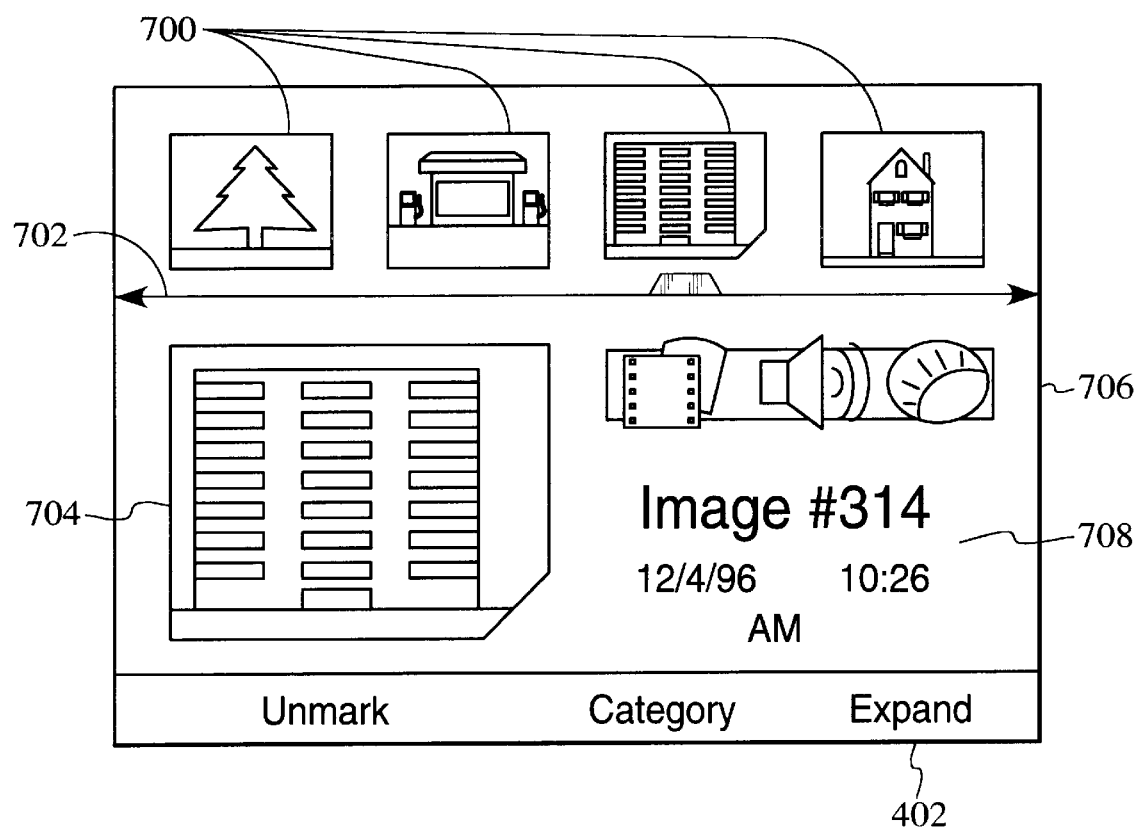
FIG. 10 is a diagram of one embodiment of the LCD display in review mode.

FIG. 10 illustrates the operation and appearance of the LCD screen 402 during review mode in accordance with the method and system. In one embodiment, the LCD Screen 402 displays four small thumbnails 700 at a time and is based on a filmstrip metaphor which allows users to quickly move forward and backward among the images according to date and time. The small thumbnails 700 are created using the thumbnail 606 stored in memory. The user navigates through the series of small thumbnails 700 using a navigation control button (not shown). As the user scrolls through the small thumbnails 700 displayed on the LCD screen 400, the small thumbnails 700 are replaced by new thumbnails 700 representing other captured images. A stationary selection arrow line 702 is used as both a navigational aid and to indicate which small thumbnail 700 is currently the selected image. As the user presses the navigation control button and the small thumbnails 700 scroll across the LCD screen 402, the small thumbnail that is placed over a selection indication in the selection arrow line 702 is considered the currently selected image. In an alternative embodiment, the selection indication is stationary except when positioned near the beginning and the end of the image list.

In a preferred embodiment, each small thumbnail 700 is oriented so that the user can view the image in the thumbnail's upright orientation without rotating the camera. Thus, each small thumbnail 700 is rotated to be in the proper orientation regardless of whether the image was taken as a landscape image or a portrait image. In a preferred embodiment, each of the small thumbnails 700 is a square. Consequently, not only are any portrait images rotated, but the aspect ratio of such images is also corrected in accordance with the method and system. However, in an alternate embodiment, the small thumbnails 700 are not cropped to a standard size. Thus, in an alternate embodiment, the size portrait and landscape small thumbnails 700 would not be uniform.

After a small thumbnail 700 becomes the currently selected image, additional information corresponding to that image is automatically displayed on the LCD screen 402. In a preferred embodiment, the additional information includes a resized thumbnail 704, showing a larger view of the currently selected image, and image information comprising an icon bar 706 and text 708. The resized thumbnail 704 is displayed using the thumbnail 606 stored in memory.

As with the small thumbnails 700, the resized thumbnail is oriented such that the user can view the image in the correct orientation without rotating the camera 110. In addition, if the aspect ratio of the CCD array 224 did not match the aspect ratio of the LCD screen 402, the aspect ratio of each small thumbnail 700 and the resized thumbnail 704 will be corrected in accordance with the method and system for use in the review mode.

Figure 11:
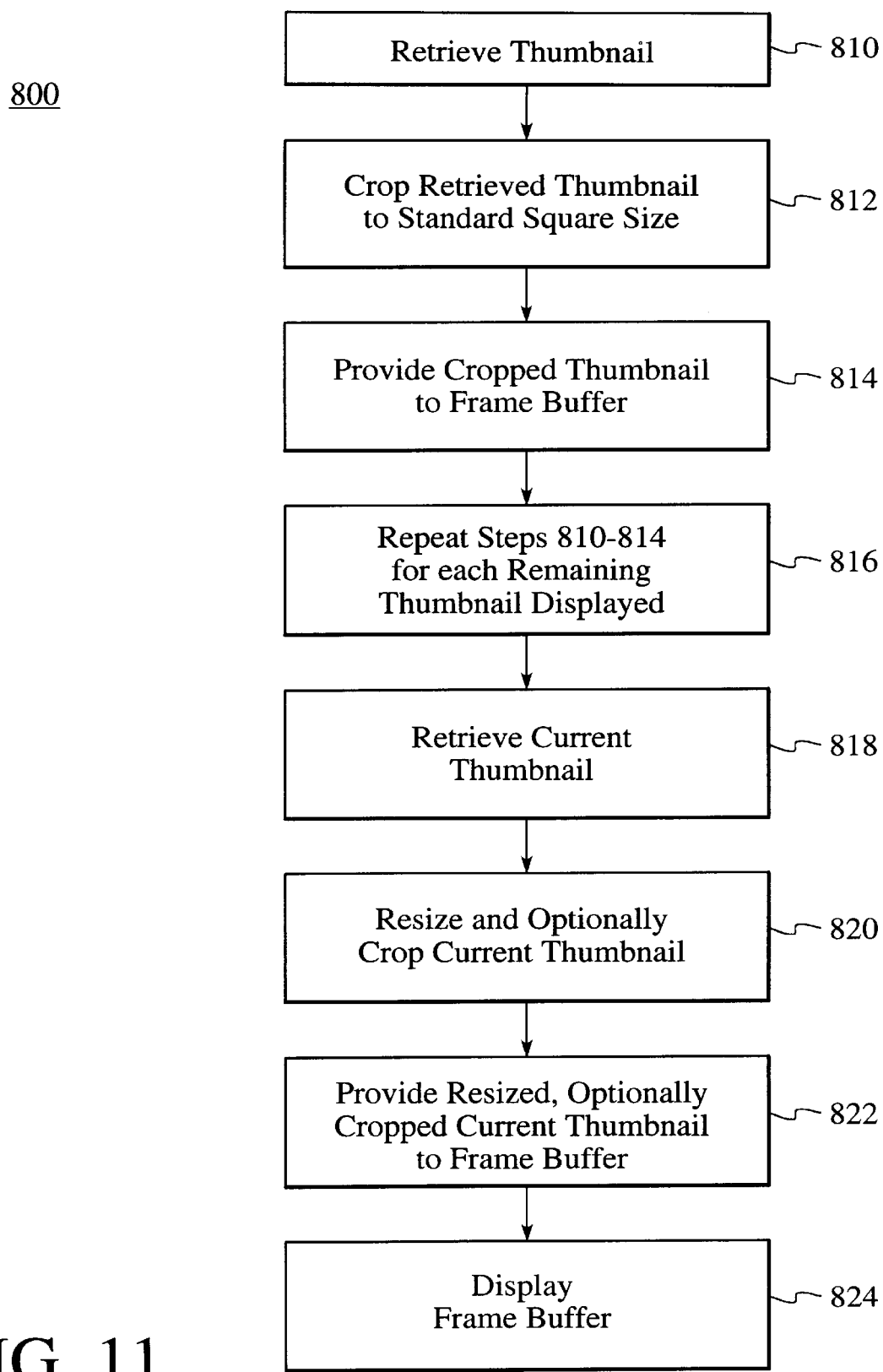
FIG. 11 is a flow chart illustrating one embodiment of the process for review mode.

To further illustrate the method and system in accordance with the present invention, refer now to FIG. 11 which depicts a method 800 for providing small thumbnails 700 and the resized thumbnail 704 in review mode irrespective of the aspect ratio of the image. In the embodiment of the method 800 depicted in FIG. 11, the orientation determination and requisite rotation are performed separately to aspect ratio correction.

First, the thumbnail image 606 is retrieved from memory via step 810. In order to be able to display both landscape and portrait images, as well as images captured using a CCD having an aspect ratio which does not match the aspect ratio of the LCD screen 402, the thumbnail image 606 is cropped. Therefore, via step 812, the thumbnail image 606 is cropped to provide a standard square image, seen as small thumbnails 700 of FIG. 10. A square is chosen because this shape is the overlap of a landscape and a portrait image. In a preferred embodiment, the left and right edge of a landscape image and the top and bottom edges of a portrait image are cropped to provide a square. Thus, in a preferred embodiment, the central square portion of an image will be used to provide the small thumbnails 700.

Once the thumbnail image 606 is cropped, it is provided to the frame buffer 536 via step 814. In the filmstrip metaphor of the embodiment shown in FIG. 10, a number of small thumbnails 700 are displayed at one time. Thus, the retrieving, cropping, and providing the thumbnail image 606 to the frame buffer 536 is repeated for each remaining small thumbnails 700 that will be displayed via step 816. In one embodiment, four small thumbnails 700 are displayed. Therefore, in this embodiment, steps 810 through 814 are carried out a total of four times.

As previously discussed, in one embodiment, a resized thumbnail 704 of the current image is displayed on LCD screen 402. In order to display the resized thumbnail 704, the current thumbnail image 606 is retrieved via step 818. The thumbnail image 606 is then resized via step 820. In one embodiment, the thumbnail image 606 is not cropped to a square shape and the image is resized to 1.5 times the size of a small thumbnail 700. Thus, referring back to FIG. 10, the resized thumbnail 704 is not a square. Instead, a larger portrait or landscape image is shown in the resized thumbnail 704. In another embodiment, the thumbnail image 606 can be both resized and cropped via step 820. In one embodiment, the square thumbnail would be resized to twice the size of a small thumbnail 700. The resized, optionally cropped thumbnail is then provided to the frame buffer 536 via step 822. The frame buffer is displayed on the LCD screen 402 via step 824.

Because the small thumbnails 700 are cropped to a standard square size, both portrait and landscape images can be displayed clearly enough to allow the user to recognize individual images. There is no wasted space, for example due to any scaling of heights of portrait images. Because there is less empty space, the small images are easier to view. The portrait and landscape images can also be displayed irrespective of whether the aspect ratio of the CCD is 3:2 or 4:3. In addition, the square size of the small thumbnails 700 allows for a more uniform display. Thus, the aspect ratio of the images displayed has been corrected.

In play mode, only a single image is displayed on the LCD screen 402. In one embodiment, the image is rotated if required so that the user may view the image in the correct orientation without rotating the camera 110. In one embodiment, a portrait image is displayed so that the height of the portrait image is the same as the height of the LCD screen 402. In this embodiment, the portrait image does not fill the screen. However, the user is also allowed to rotate the camera and view the full-sized portrait image.

Figure 12:
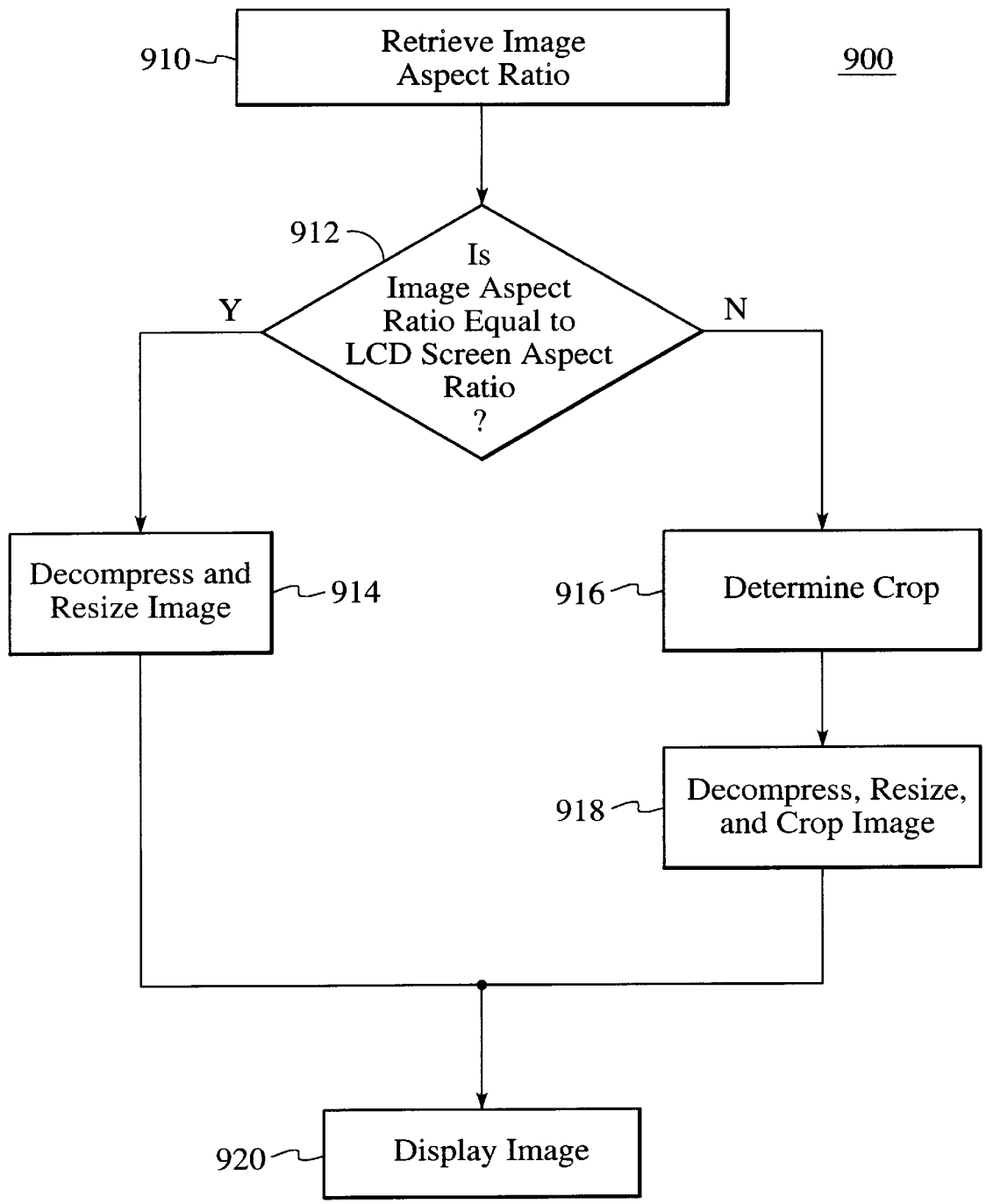
FIG. 12 is a flow chart illustrating one embodiment of the process for play mode.

FIG. 12 depicts a method 900 for correcting the aspect ratio of an image in play mode. In the embodiment of the method 900 depicted in FIG. 12, determination of the image orientation and any image rotations are performed separately from aspect ratio correction. The image aspect ratio is retrieved via step 910. The image aspect ratio may be stored with other information for the image in the image file format 600. In one embodiment, the image height and width are stored and the width is divided by the height, or vice versa, to obtain the image aspect ratio. It is then determined if the image aspect ratio is the same as the aspect ratio for the LCD screen 402 via step 912. If the image aspect ratio is the same as the LCD aspect ratio, then the screennail image 608 is decompressed and resized via step 914. The lower resolution screennail will then be displayed via step 920. If, however, the image aspect ratio does not match the LCD aspect ratio, then the required crop is determined in step 916. For example, if the image has an aspect ratio of 3:2 and the LCD screen 402 has an aspect ratio of 4:3, then the correct crop is one in which the 3:2 image is cropped to a 4:3 aspect ratio. If the image is a portrait image, for example having an aspect ratio of 3:4, then the correct crop is simply resizing the image so that the height of the portrait image is the same as the height of the LCD screen 402. Once the correct crop is determined, the screennail image 608 is decompressed, resized, and cropped via step 918. The screennail is then displayed via step 920.

The displayed image may be updated using a decompressed, resized, and, if required, cropped higher resolution image. In addition, if the screennail image 608 has not been generated, then the method and system can use the higher resolution image. The steps followed to provide the higher resolution image are analogous to the steps 910 through 920 carried out to display the lower resolution screennail. However, instead of using the screennail image 608, the higher resolution image data 604 is retrieved, decompressed, and cropped if required. Thus, regardless of the aspect ratio of the CCD array 224, the aspect ratio of the LCD screen 402, or the orientation of the image, the image can be cropped and resized to be displayed on the LCD screen 402 in an orientation which allows the user to view the image in the correct orientation without rotating the camera 110.

Although the method and system have been described in terms of the image being displayed on the LCD screen 402 of the digital camera 110, nothing prevents the method and system from being used in another environment. For example, the method and system are fully applicable to display of images on a host system with minor modifications made to some of the methods. In the host system, it would be determined if the aspect ratio of the image was equal to the aspect ratio of the display rectangle for the image in step 912 of the method 900.

A method and system have been disclosed for providing aspect ratio correction for images captured by a digital. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for correcting an aspect ratio of a screennail image captured by an image capture device comprising the steps of:

(a) determining if the aspect ratio of the screennail image matches a predetermined aspect ratio;

(b) decompressing the screennail image if required;

(c) cropping the screennail image if the aspect ratio does not match the predetermined aspect ratio;

(d) providing the screennail image to a display; and (e) updating the screennail image with a higher resolution image, the step of updating the screennail image further includes the steps of (e1) retrieving the higher resolution image;

(e2) determining if the higher resolution image requires cropping;

(e3) decompressing the higher resolution image;

(e4) cropping the higher resolution image if the higher resolution image requires cropping; and (e5) providing the higher resolution image to the display.

2. The method of claim 1 wherein the step of cropping the image further comprises the step of:

(c1) resizing the image.

3. The method of claim 2 wherein the aspect ratio determining step (a) further comprises the step of:

(a1) determining the aspect ratio of the image; and (a2) determining if the aspect ratio of the image matches an aspect ratio of the display.

4. The method of claim 3 wherein the image capture device is a digital camera.

5. The method of claim 4 wherein the display is an LCD screen.

6. A system for correcting the aspect ratio of a screennail image captured by an image capture unit comprising:

means for determining if the screennail image requires cropping;

means coupled to the determining means for decompressing the screennail image if required;

means coupled to the decompressing means for cropping the screennail image if the screennail image requires cropping;

means coupled to the cropping means for providing the image to a display; and means for updating the screennail image with a higher resolution image, the step of updating the screennail image further includes means for retrieving the higher resolution image;

means coupled to the higher resolution image retrieving means for determining if the higher resolution image requires cropping;

means coupled to the higher resolution image determining means for decompressing the higher resolution image;

means coupled to the higher resolution image decompressing means for cropping the higher resolution image if the higher resolution image requires cropping; and means coupled to the higher resolution image cropping means for providing the higher resolution image to the display.

7. The system of claim 6 wherein the decompressing means further comprise:

means for decompressing and resizing the image.

8. The system of claim 7 wherein the determining means further comprise:

means for determining the aspect ratio of the image; and matching means coupled to the aspect ratio determining means for determining if the aspect ratio of the image matches an aspect ratio of the display.

9. The system of claim 8 wherein the display is an LCD screen.

10. The system of claim 9 wherein the image capture device is a digital camera.

* * * * *